(12) United States Patent
Kinnunen

(10) Patent No.: US 8,382,470 B2
(45) Date of Patent: Feb. 26, 2013

(54) FLUIDIZED BED BOILER PLANT AND METHOD OF COMBUSTING SULFUROUS FUEL IN A FLUIDIZED BED BOILER PLANT

(75) Inventor: Pertti Kinnunen, Varkaus (FI)

(73) Assignee: Foster Wheeler Energia Oy, Espoo (FI)

( * ) Notice: Subject to any disclaimer, the term of this patent is extended or adjusted under 35 U.S.C. 154(b) by 1078 days.

(21) Appl. No.: 11/816,555

(22) PCT Filed: Feb. 16, 2006

(86) PCT No.: PCT/FI2006/000052
§ 371 (c)(1),
(2), (4) Date: Apr. 24, 2008

(87) PCT Pub. No.: WO2006/087416
PCT Pub. Date: Aug. 24, 2006

(65) Prior Publication Data
US 2009/0053661 A1   Feb. 26, 2009

(30) Foreign Application Priority Data
Feb. 17, 2005   (FI) ..................................... 20055070

(51) Int. Cl.
*F24D 3/00* (2006.01)
(52) U.S. Cl. ............. 431/7; 431/11; 431/170; 431/263; 110/245; 110/235; 110/243; 110/244; 110/345; 423/235; 423/239.1; 423/244.05; 422/111; 422/173; 60/753; 60/773
(58) Field of Classification Search ................ 431/7, 11, 431/263, 170; 110/245, 235, 243, 244, 185, 110/215, 204, 216, 345; 423/235, 239.1, 423/244.05; 422/111, 173; 60/753, 773
See application file for complete search history.

(56) References Cited

U.S. PATENT DOCUMENTS 4,323,371 A * 4/1982 Ritvanen .............................. 95/9
4,444,568 A   4/1984 Beisswenger et al. ...... 48/197 R
(Continued)

FOREIGN PATENT DOCUMENTS

DE   44 24 774 A1   1/1996
EP   0 661 498 A2   11/1994
(Continued)

OTHER PUBLICATIONS

International Search Report dated May 30, 2006, which issued in corresponding International Application No. PCT/FI2006/000052.

(Continued)

*Primary Examiner* — Steven B McAllister
*Assistant Examiner* — Avinash Savani
(74) *Attorney, Agent, or Firm* — Fitzpatrick, Cella, Harper & Scinto

(57) ABSTRACT

A fluidized bed boiler plant and a method of combusting sulfurous fuel in the fluidized bed boiler plant, a furnace of which plant is provided with a fluidized bed of particles. Sulfurous fuel, $CaCO_3$-containing sulphur-binding agent and combusting air are introduced to the bed of particles, whereby fuel burns and generates flue gases and the sulphur-binding agent calcinates to CaO and binds $SO_2$ generated in the combustion. Energy is recovered to a heat exchange medium circulating in heat exchange tubes of a condensing heat exchanger arranged in a flue gas channel, and a water solution of acid condensing on outer surfaces is neutralized by mixing it in a mixing vessel to a CaO-containing ash from a plant, preferably, fly ash collected by a dust separator.

17 Claims, 1 Drawing Sheet

U.S. PATENT DOCUMENTS

| | | | |
|---|---|---|---|
| 4,509,436 A * | 4/1985 | Schrofelbauer et al. | 110/345 |
| 4,557,202 A | 12/1985 | Warner | 110/216 |
| 4,619,671 A * | 10/1986 | Ruff et al. | 96/243 |
| 4,704,972 A | 11/1987 | Marchand | 110/345 |
| 4,860,670 A * | 8/1989 | Jorgensen | 110/215 |
| 5,171,552 A * | 12/1992 | Miura et al. | 423/239.1 |
| 5,370,067 A | 12/1994 | Finet | 110/346 |
| 5,447,703 A * | 9/1995 | Baer et al. | 423/235 |
| 5,607,011 A | 3/1997 | Abdelmalek | 165/104.14 |
| 6,279,493 B1 * | 8/2001 | Beaumont et al. | 110/346 |
| 2005/0252215 A1 * | 11/2005 | Beaumont | 60/753 |
| 2005/0287058 A1 | 12/2005 | Kinnunen | 423/244.05 |

FOREIGN PATENT DOCUMENTS

| | | |
|---|---|---|
| IN | 180721 | 4/1991 |
| JP | 53-108877 A | 9/1978 |
| WO | WO 2006/000623 A1 | 1/2006 |

OTHER PUBLICATIONS

Official Action issued by the Finland Patent and Registration Office dated Apr. 27, 2010, issued in counterpart Finnish patent application No. 20055070, with an English translation.

* cited by examiner

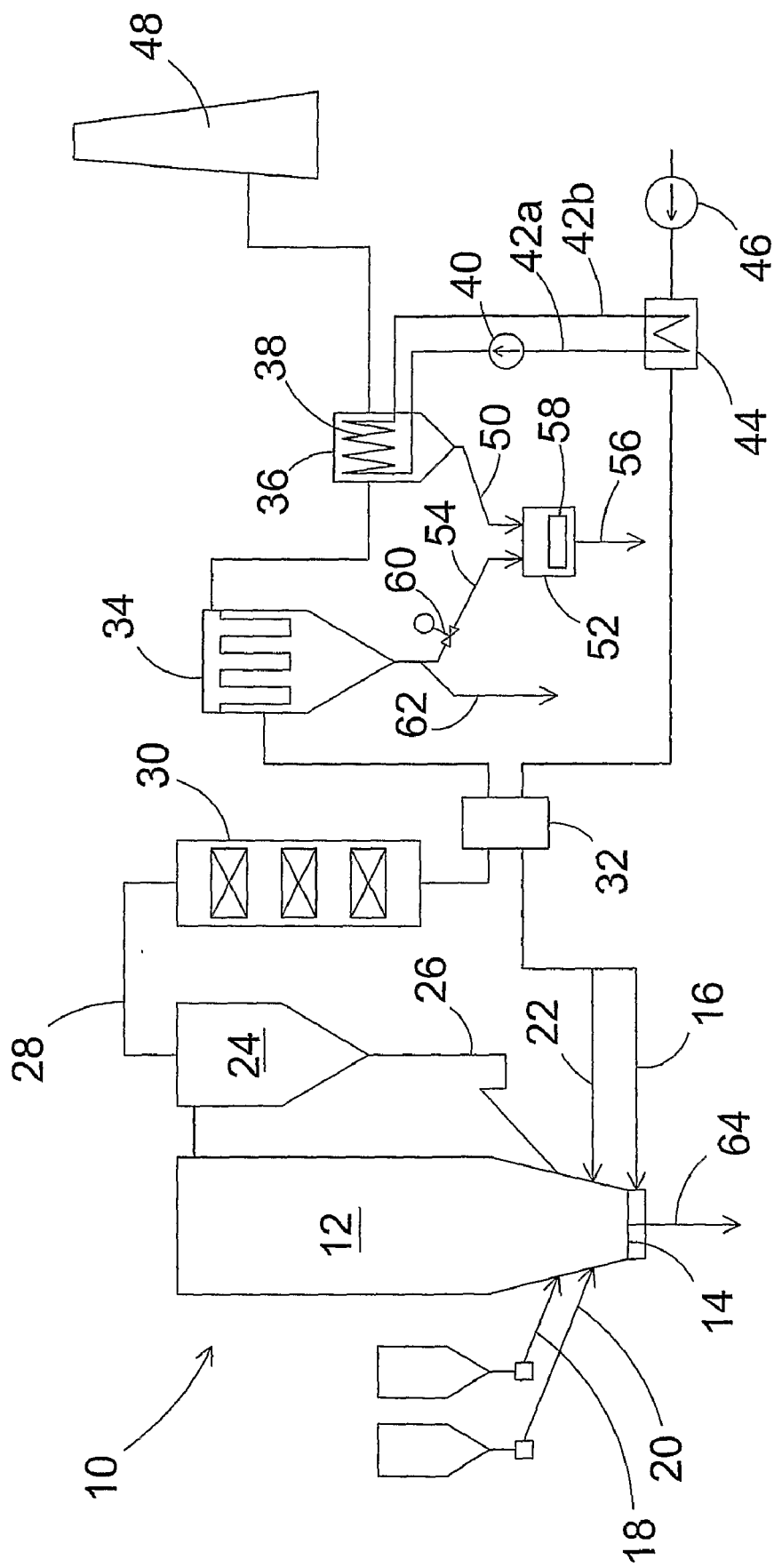

FLUIDIZED BED BOILER PLANT AND METHOD OF COMBUSTING SULFUROUS FUEL IN A FLUIDIZED BED BOILER PLANT

FIELD OF THE INVENTION

The present invention relates to a fluidized bed boiler plant having a high efficiency and a method of combusting sulfurous fuel in a fluidized bed boiler plant having a high efficiency.

BACKGROUND OF THE INVENTION

In a furnace of a fluidized bed boiler, chemical energy of a suitable fuel is converted to thermal energy by combusting it in a bed of inert material, which is arranged in the furnace and fluidized by air. In fluidized bed boilers, it is possible to bind a considerable portion of the sulfur released from the fuel by means of a sulfur-binding agent, usually limestone, being fed to the furnace. The calcium carbonate $CaCO_3$ of limestone calcinates in the furnace to calcium oxide CaO, which forms with sulfur, calcium sulphate $CaSO_4$ and calcium sulphite $CaSO_3$. In order to achieve a good sulfur-binding level, an excess of limestone, compared to the amount of the sulfur in the fuel, must be introduced, due to which part of the calcium oxide is left over as being unreacted in the ash to be removed from the boiler, which again impedes the end storage of the ash.

In a fluidized bed boiler, heat energy is recovered both with heat surfaces arranged directly to the furnace and various heat exchange means arranged in a flue gas channel. In the parts of the flue gas channel, where the temperature of the flue gases and the temperature of the surfaces of the heat exchangers remain sufficiently high, it is possible to manufacture the heat exchangers of relatively inexpensive materials.

In modern thermal power plants with a high efficiency, heat energy from flue gases is efficiently recovered by cooling the flue gases to as low a temperature as possible. When flue gases are sufficiently cooled down, for example, to 90° C., water vapor in the flue gases may condense to droplets on the surfaces of the heat exchanger. Thereby, compounds in the flue gas, especially sulfur trioxide $SO_3$ and sulfur dioxide $SO_2$, can be solved to the water layer of the heat exchanger surface and form acids, such as sulfur acid $H_2SO_4$ and sulfurous acid $H_sSO_3$, which will corrode metal surfaces.

In general, corrosion has been attempted to be minimized by manufacturing the heat exchangers of a material resistant to corrosion as much as possible. Recently, especially when the flue gases contain aggressive compounds, the trend has been, however, to manufacture heat exchangers of non-corrosive materials, for example, of Teflon® or some other suitable plastic material. For example, U.S. Pat. No. 4,557,202 discloses some methods to utilize, in a thermal power boiler, corrosion-free heat exchangers manufactured of plastics, in a so-called condensing mode.

In heat exchangers containing plastic parts, the actual heat recovery tubes being in contact with the flue gases are usually vertical or horizontal plastic tubes, or tubes covered with plastics, which are connected with metal headers. The headers again are connected with recirculation piping for a heat exchange medium, most usually, water.

When a continuous flue gas flow hits the heat exchange surface of the heat exchanger, which is at a temperature lower than the acid and water dew point, it is possible that large amounts of a corrosive liquid, such as a water solution of sulfur acid $H_2SO_4$ and sulfurous acid $H_2SO_3$ condenses on the surfaces. Thereby, a corrosive liquid, a so-called condensing liquid, may flow downwards in the flue gas channel until it is removed through a discharge channel for liquid arranged in the channel. The condensing liquid collected from the flue gas channel has to be neutralized before it can be positioned to its final collection place. The neutralization is carried out usually in a special water treatment system, which causes additional operation and equipment costs.

SUMMARY OF THE INVENTION

The present invention solves the neutralization of acid liquid condensing in heat exchangers by mixing the liquid with CaO-containing fly ash. Thereby, the treatment system for the condensing water of the heat exchangers becomes unnecessary, and water treatment costs are saved. In accordance with the present invention, at the same time, also, part of the fly ash produced in the boiler is converted to an inert form, which may be readily put to end storage.

A fluidized bed boiler plant and method of combusting sulfurous fuel in a fluidized bed boiler plant are discussed in more detail below with reference to the accompanying drawing, in which FIG. 1 schematically illustrates a fluidized bed boiler plant in accordance with a preferred embodiment of the invention.

BRIEF DESCRIPTION OF THE DRAWING

FIG. 1 schematically illustrates parts of a circulating fluidized bed boiler plant 10 in accordance with a preferred embodiment of the invention, substantial for the present invention. Sulfurous fuel 18 and agent 20 for binding oxides of the sulfur are introduced in a furnace 12 of the plant 10, which furnace 12 has a bed of particles to be fluidized by means of fluidizing air 16 to be introduced through a grid 14. Generally, in addition to the fluidizing air 16, also, secondary air 22 is fed to the furnace at one or more levels.

DETAILED DESCRIPTION OF THE PREFERRED EMBODIMENTS

In the circulating fluidized bed boiler plant 10, fuel burns in the furnace 12 typically, at a temperature of 800-950° C., whereby upwards flowing flue gases are generated, transferring particles therewith, for example, ash and incombustible fuel particles. Flue gases and particles entrained therewith are guided to a particle separator 24, in which the majority of the particles are separated from the flue gas and guided through a return duct 26 back to the furnace 12.

Hot flue gases are guided from the particle separator 24 along a flue gas channel 28 to a heat recovery section 30, in which heat energy from flue gases is recovered by means of heat exchangers therein to generate water vapor, and the temperature of the flue gases decreases, for example, to about 250-450° C. The flue gases are guided from the heat recovery section 30 to a regenerative preheater 32 for combustion in air, in which the temperature of the flue gases drops further, typically, to about 150° C.

From the regenerative heater 32 for combustion air, flue gases are guided to a dust separator 34, which may be, for example, a bag filter, as illustrated in FIG. 1, or an electrical precipitator. The fly ash separated from the flue gas in the dust separator 34 usually contains calcium oxide CaO, which has not reacted with sulfur. Because calcium oxide radically reacts with water, it may be necessary to hydrate it in a controlled manner before the end storage of the ash.

When the aim is to utilize as great a portion of the heat energy of the flue gases as possible, flue gases may be further cooled down subsequent to the preheater 32 for combustion air further in a condensing cooler for flue gases, i.e., heat exchanger 36. Heat energy form the flue gases is transferred in the heat exchange tubes 38 of the cooler 36 to a medium, usually water, being recirculated by means of a pump 40 through flow tubes 42a, 42b to a preheater 44 for combustion air. Thus, the combustion air being fed by a blower 46, is heated at two stages, first, in a preheater 44 and then in a regenerative preheater 32, whereafter the combustion air is fed to the furnace 12.

The flue gases are guided from the condensing cooler 36 to a stack 48. The fluidized bed boiler plant 10 also comprises various other parts, such as parts related to the actual steam generation and the cleaning devices for flue gas. Since they do not have any impact on the present invention, they are not shown in FIG. 1.

The aim is to cool the flue gases to a temperature as low as possible by means of the condensing cooler 36. When using conventional metal heat exchange pipings, the final temperature of the flue gases must be above the water and acid dew point of the flue gas, generally, above 100° C., to avoid corrosion.

When the heat exchange tubes 38 coming into contact with the flue gas in the cooler 36 are manufactured of plastics or some other acid-resistant material, for example, of an acid-resistant metal, the flue gases can be cooled down to a temperature of below 100° C., clearly, below the acid dew point of the flue gas, whereby water in the flue gas and acids generated by the impurities of the flue gas begin to condense on the surfaces of the heat exchanger. The temperature of the condensing heat exchanger is preferably about 80-85° C., when the fuel is hard coal, and about 90-100° C. when the fuel is especially acqueous, for example, brown coal.

According to a preferred embodiment of the present invention, the acid liquids condensing on the surfaces of the heat exchanger 36, for example, an aqueous solution of sulfur acid, are collected to a mixing vessel 52 along a liquid collection channel 50 connected to the lower part of the heat exchanger 36. Alternatively, the liquid collection channel 50 may also be connected directly to the flue gas channel 28, preferably, to a local minimum point of the flue gas channel 28 in the close proximity to the condensing cooler 36.

According to a preferred embodiment of the present invention, a part of the ash containing calcium oxide CaO separated by the dust separator 34 is collected to the mixing vessel 52 along the channel 54. The water of the liquid collected along the liquid collection channel hydrates in the mixing vessel 52 the calcium oxide CaO in the ash to form calcium hydroxide $Ca(OH_2)$. The calcium hydroxide, on the other hand, efficiently neutralizes the acid in the collected liquid, whereby dry solid material is obtained, which may advantageously be transferred through a discharge channel 56 to a suitable end storage.

A mixer 58 is preferably arranged to the mixing vessel 52, which mixes acid liquid, for example, sulfur acid, guided along the channel 50 to the vessel 52 and CaO-containing fly ash guided along channel 54 to a homogeneous mixture. The amount of fly ash to be brought to the mixing vessel 52 is preferably such that the final product to be guided to a discharge channel 56 is neutral and dry enough so that it can easily be transferred.

In order to adjust the amount of fly ash to be brought to the mixing vessel, it is possible to preferably arrange a flow control means 60 in the ash channel 54, which means 60 can be a control valve, as shown in FIG. 1, or, for example, a feed screw. When only a part of the ash collected by the dust separator 34 is fed to the mixing channel 52, the rest of the ash is removed along a separate discharge channel 62 to a separate collection point.

The present invention is described above with reference to some of the preferred embodiments of the invention. However, the invention covers other embodiments, too. A characteristic feature of a method in accordance with the invention is that acid condensing liquid of a condensing heat exchanger is neutralized by mixing it together with a CaO-containing ash.

Most preferably, the ash is fly ash collected by the dust separator, but in some embodiments, the ash to be mixed with the condensed liquid or part of it may also be bottom ash removed from the bottom of the fluidized bed reactor 12 through the channel 64. Before bottom ash and condensing liquid are mixed together, a portion, which is too coarse, may preferably be removed from the bottom ash, or ash may be comminuted in some known manner.

In the above-mentioned embodiments, the fluidized bed reactor 12 was a circulating fluidized bed reactor, but in some embodiments, the fluidized bed reactor may also be a bubbling bed reactor. In the boiler plant 10 shown in FIG. 1, three heat exchange stages, that is a heat recovery section 30, a regenerative preheater 32 for combustion air and a condensing heat exchanger 36, as well as a dust separator 34, were incorporated to the flue gas channel 28. In some other preferred embodiments, the number of heat exchange stages and dust separators, as well as their mutual positions, can vary.

By means of the condensing heat exchanger 34, it is possible to transfer heat energy to combustion air, as shown in FIG. 1, or for some other use, for example, for preheating of feed water for the boiler, heating of the condensate or generation of district heat. It is a characteristic feature of a fluidizing bed boiler plant that the fluidized bed boiler plant in accordance with the present invention is provided with a condensing heat exchanger and an ash collection system generating CaO-containing ash, and a vessel, in which acid condensing liquid from the condensing heat exchanger and a CaO-containing ash are mixed together.

The invention claimed is:

1. A method of combusting sulfurous fuel in a fluidized bed boiler plant, said method comprising the following steps of:
    (a) forming a fluidized bed of particles in a furnace of a fluidized bed boiler plant, into which bed sulfurous fuel, $CaCO_3$-containing sulfur-binding agent and combustion air are introduced, whereby the sulfurous fuel is combusted and generates flue gases, and the $CaCO_3$-containing sulfur-binding agent calcinates to CaO and binds $SO_2$ formed in the combustion of the sulfurous fuel;
    (b) guiding the generated flue gases from the furnace into a flue gas channel;
    (c) circulating a heat exchange medium in heat exchange tubes of a heat exchanger arranged in the flue gas channel;
    (d) recovering heat energy from the flue gases into a the heat exchange medium circulating in the heat exchange tubes of the heat exchanger arranged in the flue gas channel;
    (e) separating and collecting CaO-containing ash from the fluidized bed boiler plant;
    (f) adjusting the temperature of the heat exchanger in the flue gas channel so that an aqueous solution of acid, generated from the flue gases, condenses on the outer surfaces of the heat exchange tubes;
    (g) collecting the aqueous solution of acid that is condensed on the outer surfaces of the heat exchange tubes; and (h) neutralizing the collected aqueous solution by mixing it in a mixing vessel with the ash collected in step (e), in order to produce a dry, solid material.

2. A method in accordance with claim 1, wherein the heat exchange tubes are made of a plastic structure or of an acid-resistant metal.

3. A method in accordance with claim 1, wherein the temperature of the outer surface of the heat exchange tubes is lower than the water dew point of the flue gas.

4. A method in accordance with claim 1, further comprising arranging a dust separator in the flue gas channel.

5. A method in accordance with claim 1, further comprising using the heat energy recovered by the heat exchanger for at least one of (i) preheating combustion air, (ii) heating condensate, (iii) preheating feed water and (iv) generating district heat.

6. A fluidized bed boiler plant for combusting sulfurous fuel, the fluidized bed boiler plant comprising:
   a furnace with a fluidized bed of particles formed therein, into which bed sulfurous fuel, $CaCO_3$-containing sulfur-binding agent and combustion air are introduced, whereby the sulfurous fuel is combusted and generates flue gases, and the $CaCO_3$-containing sulfur-binding agent calcinates to CaO and binds $SO_2$ formed in the combustion of the sulfurous fuel;
   a flue gas channel into which the generated flue gases are guided from the furnace;
   a heat exchanger having heat exchange tubes, arranged in the flue gas channel, the temperature of the heat exchange tubes being adjusted to a temperature lower than the water dew point of the flue gas generated in the combustion of the sulfurous fuel;
   a collector for collecting an aqueous solution of acid, generated from the flue gases, that condenses on the outer surfaces of the heat exchange tubes as the temperature of the heat exchange tubes is adjusted;
   a collector for separating CaO-containing ash generated in the combustion of the sulfurous fuel in the furnace and for collecting the CaO-containing ash that is separated in the collector; and
   a mixing vessel for mixing the collected CaO-containing ash with the collected aqueous solution, in order to neutralize the collected aqueous solution and to produce a dry, solid material.

7. A fluidized bed boiler plant in accordance with claim 6, wherein the heat exchange tubes are made of a plastic structure or of an acid-resistant metal.

8. A fluidized bed boiler plant in accordance with claim 6, wherein the mixing vessel comprises a mixer for mixing the CaO-containing ash and the aqueous solution collected in the mixing vessel.

9. A fluidized bed boiler plant in accordance with claim 6, further comprising a dust separator for collecting CaO-containing fly ash generated in the combustion of fuel and for transferring the collected CaO-containing fly ash into the mixing vessel.

10. A fluidized bed boiler plant in accordance with claim 6, wherein the collector for collecting CaO-containing ash comprises a controller for controlling the amount of ash collected.

11. A fluidized bed boiler plant in accordance with claim 6, further comprising a preheater for preheating the combustion air connected to the heat exchanger.

12. A fluidized bed boiler plant in accordance with claim 6, wherein the heat exchanger is connected to at least one of a preheater for preheating feed water, a heater for heating condensate and a generator for generating district heat.

13. A method in accordance with claim 4, wherein the ash collected in step (e) is fly ash collected by the dust separator arranged in the flue gas channel.

14. A method in accordance with claim 13, further comprising transferring a portion of the fly ash collected by the dust separator into the mixing vessel.

15. A method in accordance with claim 14, further comprising controlling the amount of fly ash in the portion of fly ash transferred from the dust separator to the mixing vessel.

16. A method in accordance with claim 1, wherein the step of separating and collecting the CaO-containing ash from the fluidized bed boiler plant comprises separating the ash from the flue gases.

17. A fluidized bed boiler plant in accordance with claim 6, wherein the collector for separating the CaO-containing ash generated in the combustion of sulfurous fuel in the furnace separates the ash from the flue gases.

\* \* \* \* \*